United States Patent
Jain et al.

(10) Patent No.: US 10,402,375 B2
(45) Date of Patent: Sep. 3, 2019

(54) CLOUD CONTENT STATES FRAMEWORK

(71) Applicant: Microsoft Technology Licensing, LLC, Redmond, WA (US)

(72) Inventors: Raju Jain, Kirkland, WA (US); Robert P. St. Pierre, Redmond, WA (US); David Ben Perry, Redmond, WA (US); Mohammed Amirali Samji, Redmond, WA (US); Elizabeth P. Salowitz, Seattle, WA (US); Aaron Naoyoshi Sheung Yan Woo, Bellevue, WA (US); Anshul Rawat, Kirkland, WA (US); John H. Lueders, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 248 days.

(21) Appl. No.: 15/213,220

(22) Filed: Jul. 18, 2016

(65) Prior Publication Data

US 2018/0018345 A1     Jan. 18, 2018

(51) Int. Cl.
*G06F 16/00* (2019.01)
*G06F 3/0481* (2013.01)
(Continued)

(52) U.S. Cl.
CPC ........ *G06F 16/178* (2019.01); *G06F 3/04817* (2013.01); *G06F 9/52* (2013.01);
(Continued)

(58) Field of Classification Search
CPC .......... G06F 17/30174; G06F 3/04817; G06F 17/30215; G06F 16/178; G06F 16/1844;
(Continued)

(56) References Cited

U.S. PATENT DOCUMENTS 6,456,306 B1* 9/2002 Chin .................. H04L 41/0213
                                                     709/224
7,383,277 B2* 6/2008 Gebhard ................ G06Q 10/06
(Continued)

FOREIGN PATENT DOCUMENTS

CN         102306189 B      6/2013
EP          2698731 A1      2/2014
(Continued)

OTHER PUBLICATIONS

"How to Use Dropbox to Share Files", Retrieved from<<https://www.youtube.com/watch?v=_jDVGDu9ymk>> Feb. 15, 2012, 4 Pages.

(Continued)

*Primary Examiner* — Phuong Thao Cao

(57) ABSTRACT

A cloud content states framework is described herein. In implementations, a framework is configured to perform operations for management of cloud content files at the computing device on behalf of cloud storage providers. The framework is operable to manage states for cloud content files accessible from multiple cloud storage services. The framework also manages and outputs state indicators with file system representations of the cloud content files. The states include at least a set of primary states indicative of synchronization status controlled by the framework. The states may also include custom states associated with cloud storage services that are defined via an interface exposed by the framework. In operation, states associated with cloud content files are recognized in connection with rendering a user interface with cloud content file representations. Then, state indicators that reflect the recognized states are exposed along with cloud content file representations in the user interface.

20 Claims, 10 Drawing Sheets

(51) Int. Cl.
*G06F 16/178* (2019.01)
*G06F 16/182* (2019.01)
*H04L 29/08* (2006.01)
*G06F 9/52* (2006.01)

(52) U.S. Cl.
CPC .......... *G06F 16/00* (2019.01); *G06F 16/1844* (2019.01); *H04L 67/1095* (2013.01); *H04L 67/1097* (2013.01)

(58) Field of Classification Search
CPC ....... G06F 9/52; G06F 16/00; H04L 67/1097; H04L 67/1095
USPC ........................................................ 707/620
See application file for complete search history.

(56) References Cited

U.S. PATENT DOCUMENTS

| | | | | |
|---|---|---|---|---|
| 7,734,690 B2* | 6/2010 | Moromisato | G06Q 10/10 | 709/204 |
| 7,873,996 B1* | 1/2011 | Emigh | H04L 51/12 | 726/22 |
| 8,249,664 B1* | 8/2012 | Bauer | G06F 3/0488 | 345/173 |
| 8,332,357 B1* | 12/2012 | Chung | G06F 17/30174 | 707/634 |
| 8,370,754 B2* | 2/2013 | Bull | G11B 27/34 | 715/748 |
| 8,645,866 B2* | 2/2014 | Nestler | G06F 9/451 | 715/837 |
| 8,650,498 B1* | 2/2014 | Mihovilovic | H04L 41/22 | 707/610 |
| 9,307,006 B2* | 4/2016 | Micucci | H04L 67/02 | |
| 9,361,349 B1* | 6/2016 | Newhouse | G06F 16/27 | |
| 9,479,567 B1* | 10/2016 | Koorapati | G06F 17/30067 | |
| 9,697,269 B2* | 7/2017 | Koorapati | G06F 17/30575 | |
| 2005/0091226 A1* | 4/2005 | Lin | G06F 17/30902 | |
| 2006/0230349 A1* | 10/2006 | Novak | G06F 11/324 | 715/700 |
| 2006/0242443 A1* | 10/2006 | Talius | G06F 17/30176 | 713/400 |
| 2008/0027996 A1* | 1/2008 | Morris | G06F 17/3056 | |
| 2008/0043694 A1* | 2/2008 | Mousseau | H04L 51/14 | 370/338 |
| 2009/0187822 A1* | 7/2009 | Abreu | G06F 8/61 | 715/700 |
| 2011/0249394 A1* | 10/2011 | Nielsen | G06F 1/1632 | 361/679.41 |
| 2013/0073965 A1* | 3/2013 | Sik | G06F 17/241 | 715/730 |
| 2013/0151469 A1* | 6/2013 | Baker | G06F 17/30575 | 707/621 |
| 2013/0191339 A1* | 7/2013 | Haden | H04L 65/403 | 707/638 |
| 2013/0268480 A1* | 10/2013 | Dorman | G06F 17/30575 | 707/608 |
| 2013/0275509 A1* | 10/2013 | Micucci | H04L 67/02 | 709/204 |
| 2013/0282657 A1* | 10/2013 | Besen | G06F 17/30215 | 707/625 |
| 2014/0025712 A1* | 1/2014 | Chisa | H04L 67/1097 | 707/827 |
| 2014/0053227 A1* | 2/2014 | Ruppin | G06F 21/10 | 726/1 |
| 2014/0122886 A1* | 5/2014 | Lee | G06F 21/00 | 713/171 |
| 2014/0164449 A1* | 6/2014 | Kim | G06F 17/30233 | 707/827 |
| 2014/0173230 A1* | 6/2014 | Smith | H04L 67/1095 | 711/162 |
| 2014/0201138 A1* | 7/2014 | Dorman | G06F 17/30174 | 707/610 |
| 2014/0208404 A1* | 7/2014 | Brouwer | G06F 21/62 | 726/6 |
| 2014/0379586 A1* | 12/2014 | Sawyer | H04L 67/00 | 705/301 |
| 2015/0039557 A1* | 2/2015 | Howard | G06F 17/30174 | 707/617 |
| 2015/0286533 A1* | 10/2015 | Kaufthal | G06F 17/30176 | 707/639 |
| 2015/0288756 A1* | 10/2015 | Larabie-Belanger | G06F 16/176 | 715/753 |
| 2015/0288757 A1* | 10/2015 | Larabie-Belanger | H04L 67/1095 | 709/206 |
| 2015/0341227 A1* | 11/2015 | Tatzel | H04L 41/22 | 715/736 |
| 2015/0369623 A1* | 12/2015 | Blumenberg | G01C 21/367 | 701/532 |
| 2016/0019233 A1* | 1/2016 | Wijayaratne | G06F 17/30174 | 707/625 |
| 2016/0088102 A1* | 3/2016 | Zabaluev | H04L 67/22 | 715/736 |
| 2016/0156616 A1* | 6/2016 | Chen | H04L 67/1097 | 726/5 |
| 2016/0179855 A1* | 6/2016 | Roman | H04L 63/08 | 707/744 |
| 2016/0291856 A1* | 10/2016 | von Muhlen | G06F 3/04817 | |
| 2016/0292179 A1* | 10/2016 | von Muhlen | G06F 17/30174 | |
| 2016/0321291 A1* | 11/2016 | Malhotra | G06F 17/30233 | |
| 2016/0350322 A1* | 12/2016 | Fan | G06F 17/30126 | |
| 2016/0364301 A1* | 12/2016 | Alatorre | G06F 11/1464 | |
| 2017/0010773 A1* | 1/2017 | Curcelli | G06F 3/0483 | |
| 2017/0017551 A1* | 1/2017 | Nichols | G06F 11/1451 | |
| 2017/0124111 A1* | 5/2017 | Sharma | G06F 17/30174 | |
| 2017/0124170 A1* | 5/2017 | Koorapati | H04L 67/1095 | |
| 2017/0149885 A1* | 5/2017 | Kaplan | G06F 16/178 | |
| 2017/0177867 A1* | 6/2017 | Crofton | G06F 21/565 | |
| 2017/0180394 A1* | 6/2017 | Crofton | H04L 63/145 | |
| 2017/0180475 A1* | 6/2017 | Micucci | H04L 67/02 | |
| 2017/0277437 A1* | 9/2017 | Jones | G06F 3/0619 | |
| 2017/0308598 A1* | 10/2017 | Goldberg | G06F 16/27 | |
| 2017/0331796 A1* | 11/2017 | Crofton | H04L 63/0428 | |
| 2017/0331880 A1* | 11/2017 | Crofton | H04L 67/06 | |
| 2017/0331892 A1* | 11/2017 | Crofton | H04L 67/1097 | |
| 2017/0331893 A1* | 11/2017 | Crofton | H04L 67/1097 | |
| 2017/0339024 A1* | 11/2017 | Bhide | H04L 29/08072 | |
| 2018/0075134 A1* | 3/2018 | Fletcher | H04L 41/069 | |
| 2018/0103096 A1* | 4/2018 | Micucci | H04L 67/26 | |

FOREIGN PATENT DOCUMENTS

KR   20140074608 A  *  6/2014  ....... G06F 17/30233
WO   WO-2015153523 A1  *  10/2015  .......... G06F 11/1448

OTHER PUBLICATIONS

"Which Dropbox Icon is for which Icon Overlay Identifier Name?", Retrieved from<<https://superuser.com/questions/809529/which-dropbox-icon-is-for-which-icon-overlay-identifier-name>> Sep. 10, 2014, 3 Pages.

"International Search Report and Written Opinion Issued in PCT Application No. PCT/US2017/040628", dated Oct. 20, 2017, 10 Pages.

"New icons that show file sync status", Retrieved on: Jun. 20, 2016 Available at: https://apps.na.collabserv.com/help/index.jsp?topic=%2Fcom.ibm.cloud.whatsnew.doc_2015_11%2Fsync_icons.html.

"Sync infinite cloud storage", Retrieved on: Jun. 20, 2016 Available at: https://www.odrive.com/features/sync.

* cited by examiner

Primary States 206

Icons 302

Available Offline Synced
306

Syncing/Pending Download
308

Error State
310

Representations 304

| 312 | 314 | 316 | 318 | 320 | 322 |
|---|---|---|---|---|---|
| Available Offline and Synced | Online Only file: Available | Syncing/Pending Download | Progress on Download | Error State | Online Only file: Not Available |

*Files*

*Folders*

CLOUD CONTENT STATES FRAMEWORK

BACKGROUND

File storage and synchronization solutions available to help users manage documents and other content, store content "in the cloud," and access cloud content from various devices over a network are becoming increasingly more common. Traditionally, applications and file systems do not make distinctions between locally maintained content (e.g., local files) and cloud content (e.g., synched files) in terms of how the files are handled and/or presented to a user. Files having the same type, such as multiple .txt files, may be handled substantially in the same manner by a device without regard to whether the files are kept locally or synchronized with other devices. Accordingly, adequate mechanisms do not currently exist to recognize cloud content, associate cloud content with corresponding providers, and/or enable customized handling for cloud content.

SUMMARY

A cloud content states framework is described herein. In one or more implementations, a framework is configured to perform operations for management of cloud content files at the computing device on behalf of cloud storage providers. The framework is operable to manage states for cloud content files accessible from multiple cloud storage services. The framework also manages and outputs state indicators with file system representations of the cloud content files. The states include at least a set of primary states indicative of synchronization status that is controlled by the framework for use across the multiple cloud storage services. The states may optionally include custom states associated with one or more of the cloud storage services that are defined via an interface exposed by the framework. In operation, states associated with cloud content files are recognized in connection with rendering of a user interface configured to display file system representations of the cloud content files. Then, state indicators that reflect the recognized states are exposed along with the file system representations of the cloud content files in the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Traditionally, applications and file systems do not make distinctions between locally maintained content (e.g., local files) and cloud content (e.g., synched files) in terms of how the files are handled and/or presented to a user. Accordingly, adequate mechanisms do not currently exist to recognize cloud content, associate cloud content with corresponding providers, and/or enable customized handling for cloud content.

A cloud content states framework is described herein. In one or more implementations, a framework is configured to perform operations for management of cloud content files at the computing device on behalf of cloud storage providers. The framework is operable to manage states for cloud content files accessible from multiple cloud storage services. The framework also manages and outputs state indicators with file system representations of the cloud content files. The states include at least a set of primary states indicative of synchronization status that is controlled by the framework for use across the multiple cloud storage services. The states may optionally include custom states associated with one or more of the cloud storage services that may be defined via an interface exposed by the framework. In operation, states associated with cloud content files are recognized in connection with rendering a user interface configured to display file system representations of the cloud content files. Then, state indicators that reflect the recognized states are exposed along with the file system representations of the cloud content files in the user interface.

The cloud content states framework described herein provides a mechanism for identifying and using states for cloud content across different kinds of views. Different cloud storage providers may take advantage of the framework, which makes it easier for the providers to support state information. The user experience is enhanced because a consistent set of states and presentation of the states is employed across multiple providers, applications, and file system views. Moreover, the framework provides extensibility to define custom states that can be utilized to support a wider range of interaction scenarios in comparison to traditional approaches.

In the following discussion, an example environment is first described that may employ the techniques for cloud content states described herein. Example scenarios, user interfaces, and procedures are then described, which may be implemented in the example environment as well as other environments. Thus, example scenarios, user interfaces, and procedures are not limited to the example environment and the example environment is not limited to the illustrative examples. Lastly, an example system and components of the system are discussed that may be employed to implement aspects of the techniques described herein.

Example Environment

Figure 1:
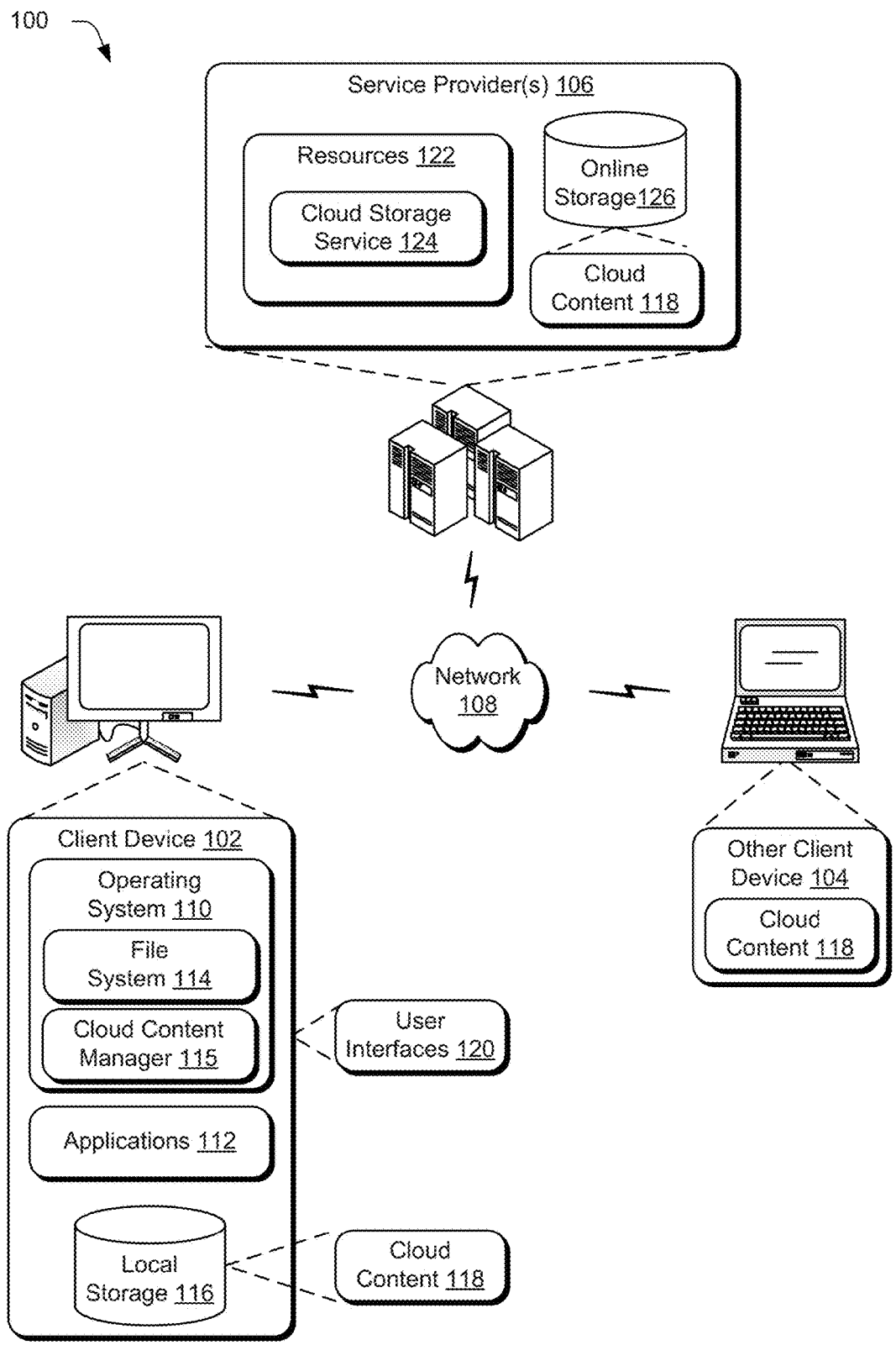
FIG. 1 is an illustration of an example operating environment that is operable to employ techniques to implement a cloud content states framework.

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 10.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 is also illustrated as including a file system 114 and a cloud content manager 115. In this example, the file system 114 and cloud content manager 115 are depicted as being implemented as components of the operating system 110. Alternatively, one or both of the file system 114 or cloud content manager 115 may be provided as a standalone application and/or as a component of another application 112.

The file system 114 represents functionality to define and control the way in which files are named and where they are placed logically for storage and retrieval. The file system may employ a hierarchical (tree) structure. In this approach, files are organized in directories (or folders) that correspond to space in memory allocated to the files. The file system 114 also includes a format for specifying the path to a file through the structure of directories. The file system 114 can employ paths that point to various storage locations, such as an internal hard drive, an external storage device, and network file locations. In accordance with techniques described in this document, the file system 114 also supports enumeration of cloud content files associated with one or more online providers. The file system 114 in conjunction with the operating system 110 exposes the cloud content files in various view of the file system structure alongside and in the same manner as local, offline files.

The cloud content manager 115 represents client-side functionality to enable various synchronization of various files over the network 108. For example, the client device 102 may include local storage 116 that may be used to store local files as well as cloud content 118 the may be synchronized with other devices (e.g., "synched files"). The cloud content manager 115 may operate to connect to multiple cloud content services provided by service providers 106 to perform file synchronization and related operations. By way of example, cloud content 118 is shown in FIG. 1 as being associated with both the client device 102 and other client device 104. In this context, cloud content 118 may represent local versions of files that are maintained in respective local storage 116 of multiple different devices and that may be synchronized across the multiple different devices via cloud content managers 115 deployed to the devices. The cloud content 118 may also include representations for and/or links to un-synced files that are maintained in remote, online storage accessible via cloud storage providers. As noted, the file system 114 is configured to manage and provide representations of both local and online files in common views available via the operating system 110 and through file access functionality of various applications 112. Additionally, state information associated with the files can be exposed to provide indications regarding the status of the files in the manner described herein. The file system representations and state information may be presented in various different forms and views via user interfaces 120 output via the operating system 110 and/or different applications 112.

In particular, the cloud content manager 115 further represents functionality to implement the cloud content states framework as described above and below. The framework enables state information to be associated with cloud content files and used in conjunction with various views of file system representations that include cloud content files. The framework may define and control a set of primary states that relate to synchronization status of the files. Thus, icons or other state indicators defined for the primary states may be shown along with items in file system representations to visually display synchronization status of corresponding cloud content files. Additionally, the framework supports custom states that may be used alongside with the primary states to extend the framework and support custom interaction scenarios. Details regarding these and other aspects of techniques to implement cloud content states are discussed in relation to the following figures.

The service provider 106 includes functionality operable by the service provider 106 to manage various resources 122 that may be made available over the network 108. For example, various resources 122 may be provided via webpages or other user interfaces 120 that are communicated over the network for output by one or more clients via a web browser or other client application. The service provider 106 manages access to the resources 122, performance of the resources, and configuration of user interfaces 120 to provide the resources 122, and so on. The service provider 106 may represent one or more server devices used to provide the various resources 122.

Generally, resources 122 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 122. Content may include various combinations of text, multi-media streams, documents, application files, photos, audio/video files animations, images, web pages, web applications, device applications, content for display by a browser or other client application, and the like.

One particular example of a resource 122 that may be provided by a service provider 106 is a cloud storage service 124 as depicted in FIG. 1. The techniques described herein are applicable to multiple different cloud storage services that may be provided by multiple different service providers (e.g., multiple cloud storage providers). In this context, the cloud storage service 124 is representative of functionality operable to provide and manage online storage 126 that may be allocated to user accounts associated with a service provider 106. The online storage 126 provides users with storage "in the cloud" for cloud content 118 such as documents, application files, photos, mobile uploads, and audio/video files so users may access their content items from anywhere over the network 108, and share content to collaborate with others. The cloud storage service 124 also enables users to synchronize files across multiple different devices designated by the users. Multiple cloud storage services provided by third parties (e.g., other providers) may also provide respective storage and file synchronization. Thus, cloud content 118 may be synchronized across multiple devices via different cloud storage services through interaction with corresponding cloud content managers 115 deployed to client devices.

As represented in FIG. 1, respective versions of files corresponding to cloud content 118 that is associated with a particular cloud storage service 124 may be stored locally by each client device in local storage 116. In addition or alternatively, the file system 114 may include links to and representation of content that is maintained in the cloud, such as un-synced files or files that are designated for online access only. Generally, the cloud storage service 124 is also configured to store respective versions of at least some files in online storage 126 for online access in addition to storing and synching of content locally at each device.

Clients may access the cloud storage service 124 and other resources 122 provided by a service provider 106 through client/user accounts to which the clients are authenticated. For instance, to access resources 122, a client device may provide a username and password that is authenticated by an authentication service. When the authentication is successful (e.g., the client "is who they say they are"), the authentication service may pass a token (or other suitable authentication identifier/secret) to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

Cloud Content States Framework Details

Having consider the foregoing discussion of an example operating environment, consider now further details regarding techniques to implement cloud content states that are described in this section. In particular, aspects of a cloud content states framework are discussed in relation to example scenarios, user interfaces, and techniques represented and described in relation to FIGS. 2 to 7.

Presenting Cloud Content States

Figure 2:
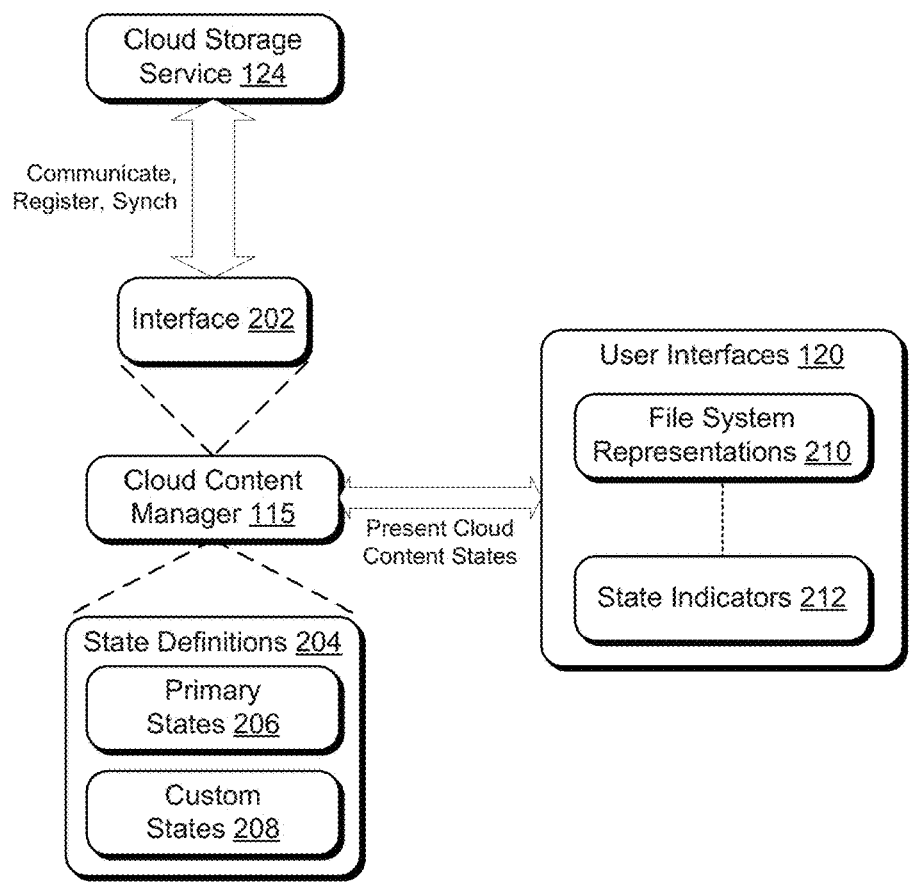
FIG. 2 is a diagram depicting an example scenario for presenting cloud content states in accordance with one or more implementations.

FIG. 2, depicts a diagram showing an example scenario for implementing cloud content states, generally at 200. In particular, FIG. 2 represents interactions and operations that may occur between a cloud content manager 115 and a cloud storage service 124 to present cloud content states. As represented the cloud content manager 115 may expose an interface 202 that enables cloud storage services 124 to communicate with and interact with the cloud content manager 115. Various formats and protocols for the interface 202 are contemplated. In an implementation, the interface 202 is configured as an application programming interface (API) designed to enable multiple cloud storage services to plug-in to the framework supplied for management of cloud content on behalf of the multiple cloud storage services. Generally, the interface 202 enables cloud storage services 124 to communicate, register, and synchronize files with cloud content managers 115 deployed to one or more end user devices. The interface 202 also facilitates creation and deployment of custom states as described herein.

The cloud content manager 115 includes or makes use of a collection of state definitions 204 that define states available for cloud content 118. Generally, the state definitions 204 include a description of the state, an icon or other state indicator to represent the state, and criteria used to establish when the state applies to content items. State definitions 204 may also include indications of priorities for the states, which are used to control handling, ordering, and presentation of states based on the priorities. The state definitions 204 include at least a set of primary states 206. The primary states 206 are a set of standard states defined by and controlled by the framework/OS. The primary states 206 are intended to be made available to and used across multiple different cloud storage services 124. By doing so, the state representations are consistent and readily understandable to users no matter which service or services the users choose to utilize for cloud storage. Primary states 206 may be implemented in various ways details of which are discussed in relation to FIG. 3 below.

The state definitions 204 may also optionally include custom states 208 that are defined by individual providers for use with content associated with those providers. The custom states 208 may be defined and updated via the interface 202. A custom state may be used exclusively with content associated with a particular provider that created/deployed the state. It may also be possible for providers or users to share customs states to provide extended functionality. Custom states 208 may be implemented in various ways details of which are discussed in relation to FIG. 4 below.

The cloud content manager 115 references and utilizes the state definitions 204 to present cloud content states along with representations of content in various user interfaces 120. Cloud content states associated with cloud content files may include either or both of primary states 206 or custom states 208. A particular cloud content file may be associated with different states at different times. Moreover, at a given point in time one or multiple states may be assigned to a particular cloud content file. Additionally, state information for a file may be undefined or blank (e.g., no specific state is assigned).

Cloud content manager 115 causes the information regarding cloud content states to be presented in conjunction with different views of file systems representations 210. For instance, file systems representations 210 exposed in user interfaces 120 associated with the operating system 110, file system 114, and/or various applications 112 may include state indicators 212 to represent states associated with content items. The state indicators 212 may be configured as icons or other graphic elements assigned to different states. Presentation of the state indicators 212 is controlled via the cloud content manager 115 and/or the corresponding framework implemented by the device/operating system 110. Thus, the state indicators 212 are maintained by and rendered directly via the framework as part of the file system instead of being implemented at the application level by individual providers/application using overlays. State indicators 212 may be utilized to provide cloud content state indications in various views, throughout the device user experience, and across various different applications and devices. For example, file icons and folders, lists of recently used documents, favorites list, pinned documents, links and/or other references to documents presented within an application user interface, and other file systems representations may be rendered to include state indicators 212 indicative of corresponding states that are associated with content items.

Cloud Content States and Indicators

As noted, the cloud content states framework defines and controls a set of primary states 206 that relate to synchronization status of the files. Icons or other state indicators 212 defined for the primary states may be shown along with items in file system representations to visually display synchronization status of corresponding cloud content files. The primary states 206 and corresponding state indicators 212 may be configured in various ways.

In general, the primary states 206 are a set of established states designed to be shared across different cloud storage providers. The primary states 206 deliver a consistent representation of states across views, applications, devices, and platforms. Although custom states may be supported, the primary states 206 may be assigned higher priority than custom states. States may be handled, listed, ordered, and managed based at least in part on corresponding priorities. Consequently, for visual representations including multiple state indicators, primary states are placed in locations considered to be the most prominent with additional states being arranged around the placement of primary states. Additionally, the primary states 206 may be optionally implemented as a fixed set of states that cannot be overridden or replaced by customs states or icons.

As noted, the primary states 206 relate to synchronization status of cloud content 118. Various different states may be defined to reflect information such as whether a file is available or not, located online or offline, actively downloading (e.g., in progress), queued for downloading, synchronized or unsynchronized with the service, or associated with an error, to name a few examples. Different numbers and types of primary states 206 may be utilized in different implementations. Visual indicators 212 for the states may use various combinations of designs, graphics, colors, text, images, animations, and so forth.

Figure 3:
FIG. 3 is diagram depicting details regarding a set of primary states in accordance with one or more implementations.
Figure 3:
Figure 3:
Figure 3:
Figure 3:
Figure 3:
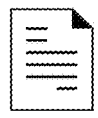
Figure 3:
Figure 3:
Figure 3:
Figure 3:
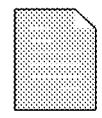
Figure 3:
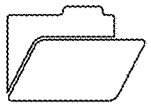
Figure 3:
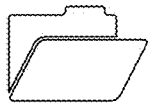
Figure 3:
Figure 3:
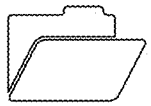
Figure 3:
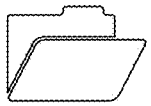
Figure 3:
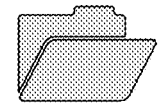

By way of example and not limitation, FIG. 3 is a diagram that depicts generally at 300 details regarding an example set of primary states 206 and corresponding representations that may be employed in one or more implementations. The primary states 206 are associated with a set of corresponding icons 302 and representations 304 of states that make use of the icons 302. In this example, the icons 302 include at least checkmark icon 306 used to represent files available offline and synched, an arrow icon 308 to represent status as synching or pending download, and an x-out icon 310 to represent an error state. Additionally, status as being available only online (e.g., not available offline) may be represented by not showing one of the icons 302 with an item. In other words, absence of one of the defined icons 302 with an item is an indication that the item is not available locally at a device.

In this context, representations 304 may be defined for files and folders that use the icons to represent various state information for underlying content items. In the depicted example, the primary states 206 that are available include example states 312 to 322 shown in FIG. 3. In particular, the example states include available offline and synched 312, online only file: available 314, synching/pending download 316, progress on download 318, error state 320, and online only file: not available 322. As noted, these enumerated states are intended as illustrative examples and various different and/or additional states may be defined and employed for a set of primary states 206 in different implementations.

Different combinations of the icons 302 with file system representations of the files and folders (e.g., file icons and folder icons) are constructed to represent the different states and examples of which are shown in rows below the corresponding states in FIG. 3. For example, the representation of a file for available offline and synched 312 is produced by rendering the checkmark icon 306 in proximity to the file icon. In this example, checkmark icon 306 is arranged as a small graphic placed below and to the left side of the file icon, though, other arrangements may be employed for different views and in different implementations. Other icons to represent other states may be associated with file icons in a comparable manner Generally, the state representations for folders are also produced in the same way. It is noted, though, that state representations for folders may differ from representations for individual files since the folders may contain multiple files each associated with different states. The state representations shown for a folder may be selected to provide an overall state derived for multiple individual files contained in the folder.

The progress on download 318 state is employed for files that are actively downloading. In implementations, the progress on download 318 state for files may be represented using a progress bar that is updated as the download is occurring to show progress and/or time remaining. Notice, however, that the corresponding folder may use the arrow icon 308 instead of a progress bar since a progress bar may not be applicable to each file in the folder. This is an example of a scenario in which the state representations for a folder reflects an overall state derived for multiple individual files in the folder and the folder state differs from representations for individual files.

Further, availability of files as being on-line only files is represented by not showing one of the icons 302 with corresponding items. This approach is reflected for both online only file: available 314 and online only file: not available 322 states. Additional visual indications may be used to distinguish between available and unavailable files. Availability may depend upon network connectivity, service availability, access permissions, account log-in status, and so forth. Here, the unavailable files and folders are represented as being "grayed-out" to show that the files are not currently accessible. Another approach is to define different indicators for available and unavailable files. Still further, a custom state could be defined and used to reflect availability in addition to primary state representations.

The framework additionally supports custom states 208 that may be used alongside with the primary states 206 to extend the framework and support custom interaction scenarios. While primary states 206 are defined by the framework for use across providers, custom states 208 are provider defined states that may be specific to individual providers. It is noted that custom states 208 to add-on to the primary states 206 may also be defined by the framework itself and shared across providers. Additionally, a provider/user may develop a custom state that may be shared with and adopted by multiple providers.

Providers may define any number of custom states 208 for their cloud storage system within practical constraints for handling, using, and displaying the state information. In views of state information, the different states associated with items are arranged and displayed based on priorities and the display may present a limited number of the states selected according to the priorities in the views. Additional state information may be available through interaction with particular items such as by hovering a cursor proximate to an item, selecting a detailed view, changing the arrangement of default views, and so forth.

Figure 4:
FIG. 4 is diagram depicting details regarding custom states in accordance with one or more implementations.

Various custom states 208 may be defined and associated with corresponding state indicators 212. The custom states 208 may be defined via an interface 202 as previously described. By way of example and not limitation, FIG. 4 is a diagram that depicts generally at 400 details regarding example custom states 208 and corresponding representations for the custom states that may be employed in one or more implementations. In particular, custom states 208 may reflect a variety of different types of information for cloud content such as logos 402 for providers; locations 404 including geographic locations and storage locations, categories 406 defined for items such as editing categories, segments, and work/home/group designations; sharing 408 statuses for content; access restrictions 410 for items; and status 412 information such as licensing parameters, free/pay content, sources, and so forth. Again, these enumerated states are intended as illustrative examples and various other 414 kinds of states may be defined and employed as custom states 208 in different implementations. Representative example icons that may be used as state indicators 212 are also shown with the different custom states 208 in FIG. 4. Naturally, providers may select any suitable icons or other state indicators 212 for their custom states 208 and the choice of icons/indicators is not intended to be limited to the depicted examples.

Figure 5:
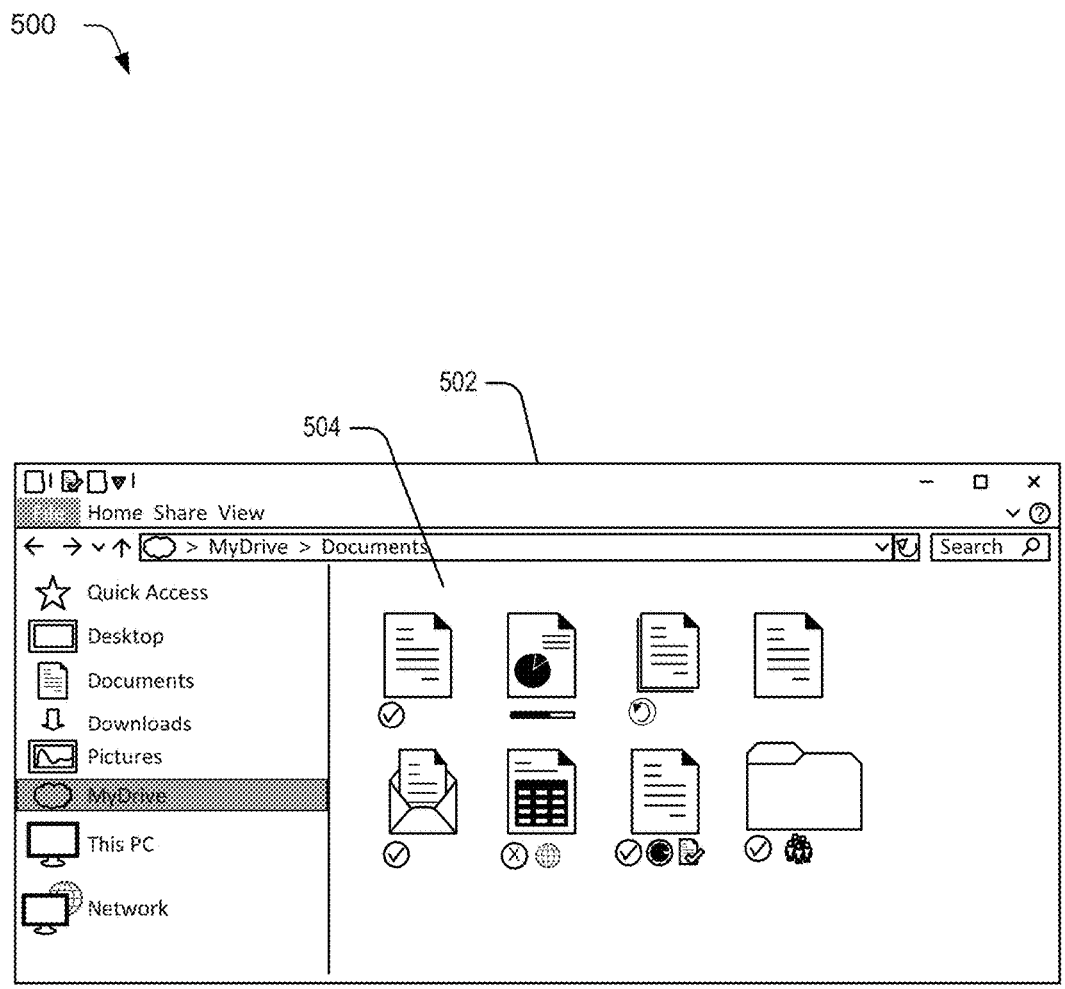
FIG. 5 is diagram depicting an example user interface having an icon view of a file system representation in accordance with one or more implementations.
Figure 6:
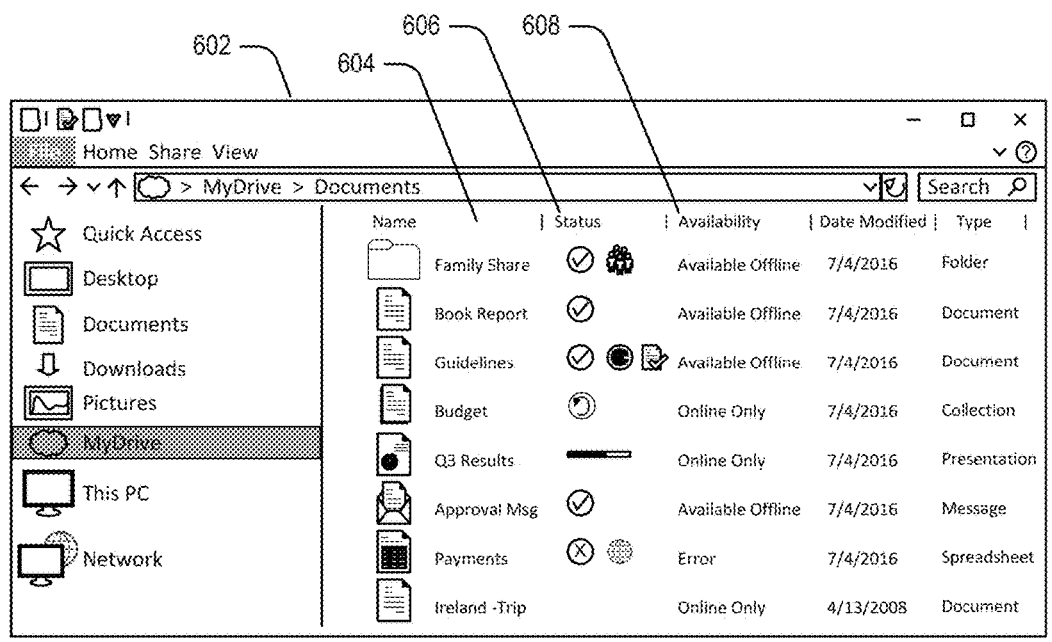
FIG. 6 is diagram depicting an example user interface having a list view of a file system representation in accordance with one or more implementations.
Figure 7:
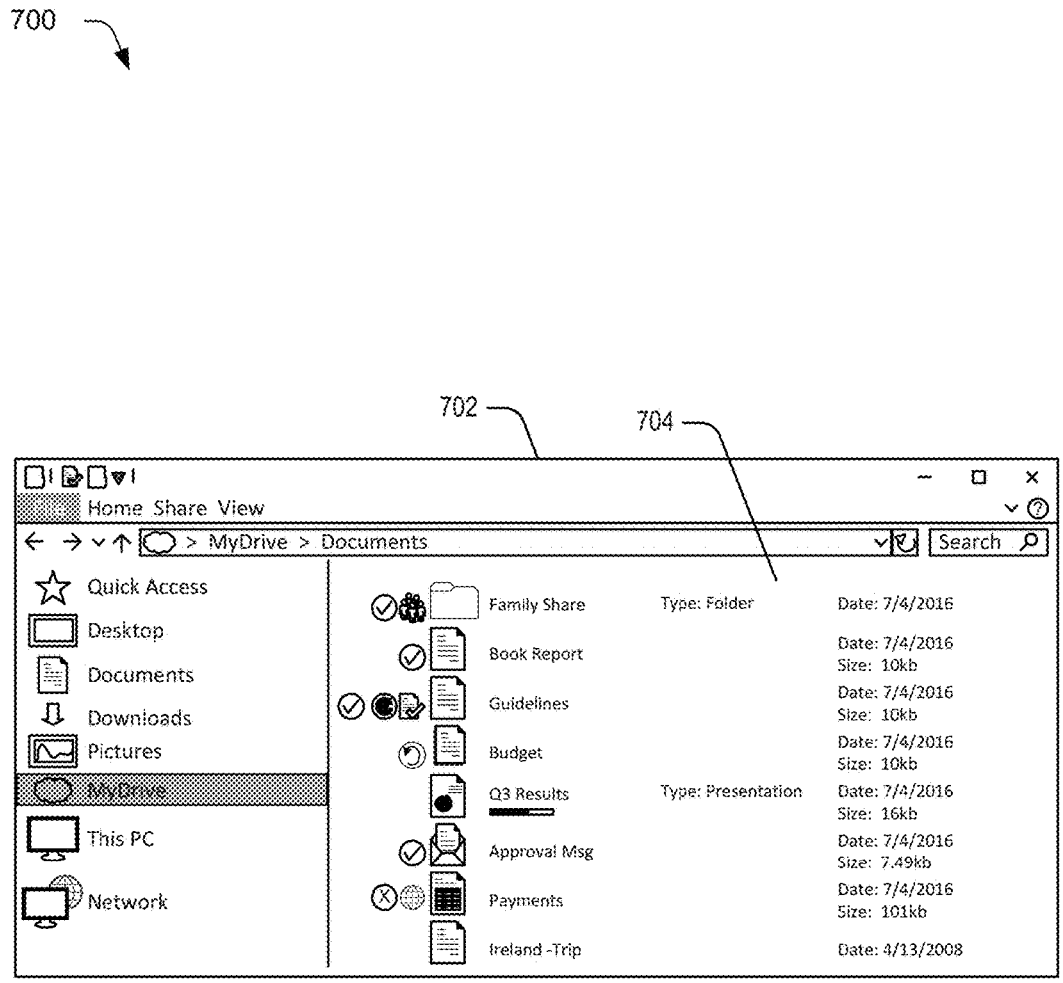
FIG. 7 is diagram depicting an example user interface having a list view of a file system representation in accordance with one or more implementations.

Further details regarding techniques for cloud content states framework are discussed in relation to user interface examples of FIGS. 5 to 7. In general, the cloud content states framework implemented via a cloud content manager 115 is operable to configure user interfaces 120 to include state indications in any suitable way. State indications may be made available across the device user experience and in various different views of file system information. In one or more implementations, the framework defines and enforces principles for configuration of the user interfaces 120 and arrangement of state indicators 212 with the UIs and different views. As noted, states and corresponding state indicators 212 may be handled and arranged based at least in part upon priorities assigned to the states. The precise locations in which state indicators 212 are placed, the order of placement, and selection of which states to show, though, may change depending upon the particular view and for different implementations.

In one particular example, state indicators 212 associated with files and folders are laid out from left to right with the left most position being considered the primary position. This tracks the typical left to right pattern for most content. A set number of slots may also be specified to control how many different states may be represented for a given item. For example, the number of slots may be set in a range of about three to ten slots for display of state indicators 212. The primary states 206 may be assigned highest priority in which case primary state representations occupy the left most position and additional indications of state are placed in sequence in accordance with priority from left to right after the left most position.

While the placement of state indicators 212 relative to cloud content file representations may vary, in at least some implementations the framework is configured to place the state indicators 212 so that the indicators do not interfere with the cloud content file representations. Consequently, the state indicators 212 may be placed in positions proximate to file/folder icons, but outside visual boundaries of the file/folder icons. In this approach, the state indicators 212 do not overlay the visual boundaries or interfere with filenames or other textual labels. Additionally, placement of state indicators 212 may further depend upon the size of the file/folder icons and the layout of the view. For example, state indicators 212 may be placed in a dedicated column within a list view whereas the state indicators 212 may be positioned in closed proximity to visual boundaries of file/folder icons in icons views.

FIG. 5 is a diagram depicting generally at 500 an example user interface 502 having an icon view of a file system representation in accordance with one or more implementations. The example user interface 502 includes a pane 504 having a view of a file system representation. In this example, the file system representation shows icons for a collection of files and folders associated with a particular file storage location. The file storage location may be associated with a cloud storage service 124 with the files contained therein being managed via the file system 114 and/or a cloud content manger 115.

The file system representation also includes state indicators 212 that are associated with the file and folder icons in accordance with the techniques described herein. The state indicators 212 are included for both primary states 206 and custom states 208. The state indicators 212 may be associated with and arranged relative to representations for particular items in accordance with principles discussed above and below. For instance, in the icon view shown in FIG. 5, different state indicators 212 for primary states 206 are shown for different items. The primary states 206 may be represented in a priority position or slot, which in this example is the left most position. The state indicators 212 are aligned underneath corresponding file/folder icons in relatively close proximity to visual boundaries of the file/folder icons. At least some of the file/folder icons are associated with state indicators 212 for multiple states. For such items, the positioning of the multiple state indicators is controlled in dependence on priorities. Consequently, indicators are arranged from left to right with primary states shown first and any custom states shown thereafter. Textual descriptions of the different states may be selectively exposed responsive to hovering of a cursor over the corresponding state indicators 212. In the event that there are more states associated with an tem than may be displayed in available slots, the framework facilitates access to additional state indicators in various ways. For example, a control element such as ellipses or a drop down selector may be provided to enable access to additional state information and state indicators. In another approach, a defined action such as a right click or particular gesture may be configured to cause display of the additional state indications.

FIG. 6 is a diagram depicting generally at 600 an example user interface 602 having a list view of a file system representation in accordance with one or more implementations. The example user interface 602 includes a pane 604 having a view of a file system representation. In this example, the file system representation shows entries for a collection of files and folders in a list or grid view along with associated properties.

In the list or grid view, different properties of file system items are shown as entries in an arrangement of row and columns. In the represented example, different columns correspond to different properties with a status column 606 configured to present state indicators 212 associated with each entry. The status column 606 may be configured to show up to a defined number of state indicators 212 such as three, four, or five indicators. Again, hovering over or in close proximity to state indicators 212 may expose corresponding descriptions or labels. In addition, or alternatively, an additional column may be selectively displayed to show the descriptions or labels, such as the example availability column 608 in FIG. 6. Additionally, the framework may facilitate access to any additional state indicators that are not currently shown in the view in various ways, examples of which were discussed in relation to FIG. 5.

FIG. 7 is a diagram depicting generally at 700 an example user interface 702 having a detail view of a file system representation in accordance with one or more implementations. The example user interface 702 represents an additional, different view for a file system representation that may employ state indicators 212 as described in this document. In this example, the user interface 702 includes a pane 704 showing entries for items with corresponding details. In this case, each entry is contained in a separate row along with an arrangement of corresponding details. Here, the details include state indicators 212 that are associated with the files and folders. The state indicators 212 may be aligned in proximity to icons for the files and folder in various ways. By way of example and not limitation, the state indicators 212 are represented as being placed in front of the rows, to the left of the file/folder icons, and inline with a horizontal axis of the rows and icons.

Together, the examples UIs of FIGS. 5 to 7 illustrate that state indicators 212 associated with cloud content 118 may be utilized in various ways to convey information regarding states for the cloud content 118. Different arrangements of the state indicators 212 may be utilized in different views of file system representations. Moreover, state indicators 212 may be utilized across different applications and throughout the user experience wherever file system representations are exposed. A variety of different configurations of UIs and arrangements of state indicators 212 for the UIs are contemplated in addition to the illustrative examples of FIGS. 5 to 7.

Having considered an example environment, scenarios, and user interfaces, consider now a discussion of some example procedures for cloud content states in accordance with one or more embodiments.

Example Procedures

The following discussion describes cloud content state techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment, scenarios, and user interfaces discussed in relation to FIGS. 1 to 7. In at least some embodiments, the procedures may be performed by a suitably configured computing device, such as a client device that includes or otherwise makes use of a file system 114 and/or a cloud content manager 115.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 8:
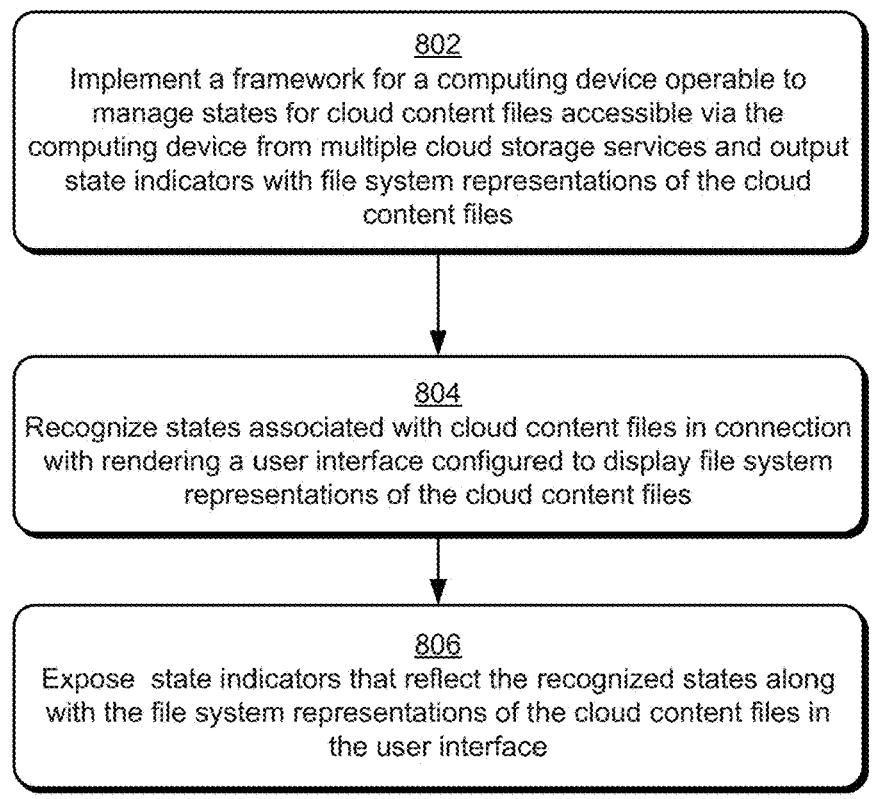
FIG. 8 is a flow diagram depicting an example procedure to expose state indicators representative of cloud content states in accordance with one or more implementations.

FIG. 8 is a flow diagram depicting an example procedure 800 to expose state indictors representative of cloud content states in accordance with one or more implementations. A framework for a computing device is implemented that is operable to manage states for cloud content files accessible via the computing device from multiple cloud storage services and output state indicators with file system representations of the cloud content files (block 802). For example, a framework as described herein may be implemented in various ways. In one approach, the framework is implemented as a component of an operating system 110 of the computing device. The framework may be implemented via a cloud content manager 115 that is included with the operating system 110, or otherwise invoked by the operating system to instantiate the framework. The cloud content manager 115 may alternatively be provided as a standalone application designed to implement the framework. In one or more implementations, the states supported by the framework include a set of primary states 206 that are indicative of synchronization status provided by the framework. The cloud content files include content synchronized over a network with multiple cloud storage services to facilitate access online access to the cloud content files across multiple devices. The primary states 206 are defined by the framework/OS and controlled by the framework/OS for use across multiple cloud storage services.

States associated with cloud content files are recognized in connection with rendering a user interface configured to display file system representations of the cloud content file (block 804) and state indicators are exposed that reflect the recognized states along with the file system representations of the cloud content files in the user interface (block 806). For example, the framework may be configured to expose state indicators 212 across multiple different views of file system representations as previously described. The different views may be made available through the operating system 110 and/or one or more other applications 112 of a computing device 102.

In implementations, the framework may operate to interact with cloud storage providers and make assessments of individual files to recognize corresponding states. The assessments may be made in dependence upon state definitions 204 that define the various states. Based on the assessments, the framework may associate metadata with the cloud content files to reflect recognized states. Then, to expose state indicators 212, the framework may perform further operations to parse the metadata and ascertain states associated with cloud content files, map the states to corresponding state indicators with reference to the state definitions 204, and render items to represent the cloud content files in a user interface 120 along with corresponding states indicators 212.

Accordingly, exposing the state indicators 212 includes rendering the state indicators 212 in association with items used to represent the cloud content files in a user interface 120, such as the examples discussed in relation to FIGS. 5 to 7. For instance, the state indicators may be configured as icons each representing a different synchronization status. In implementations, the set of primary states 206 include at least an available offline state, a pending state, and an error state. Thus, the icons representing the states include a different icon used to visually represent each state. States may also include custom states 208 in addition to the primary states 206 as discussed previously and further discussed in relation to the following example procedure.

Figure 9:
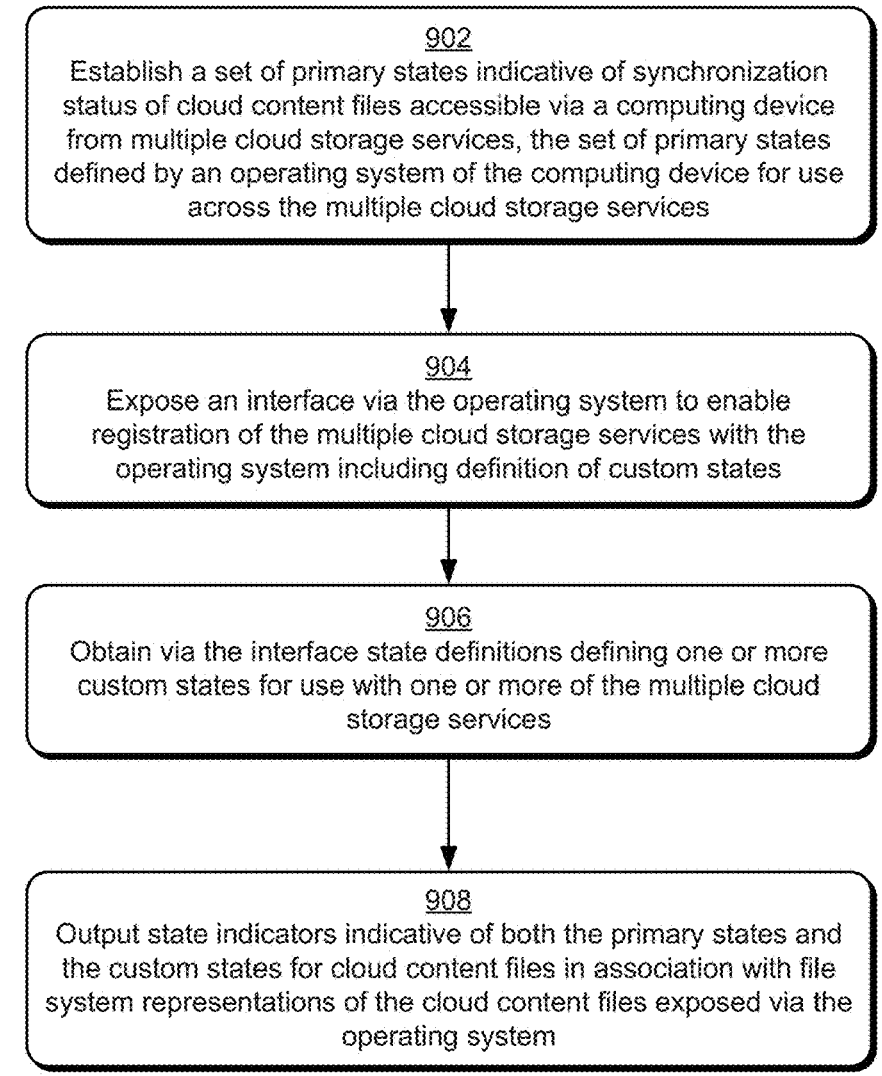
FIG. 9 is a flow diagram depicting an example procedure to output state indicators indicative of both primary states and custom states for cloud content files in accordance with one or more implementations.

In particular, FIG. 9 is a flow diagram depicting an example procedure 900 to output state indicators indicative of both the primary states and the custom states for cloud content files in accordance with one or more implementations. A set of primary states is established that are indicative of synchronization status of cloud content files accessible via a computing device from multiple cloud storage services and defined by an operating system of the computing device for use across the multiple cloud storage services (block 902). For example, an operating system 110 may implement a framework to manage cloud content 118 on behalf of cloud storage providers. The framework is further designed to implement a set of primary states 206 configured in accordance with the example and details described previously herein.

An interface is exposed via the operating system to enable registration of the multiple cloud storage services with the operating system including definition of custom states (block 904) and state definitions defining one or more custom states for use with one or more of the multiple cloud storage services are obtained via the interface (block 906). For example, the framework may expose an interface 202 that as noted above enables cloud storage services to communicate and interact with the framework, through a cloud content manager 115 or otherwise. In implementations, the interface comprises an application programming interface (API) designed to enable multiple cloud storage services to plug-in to the framework supplied by the operating system. Through the interface 202, providers may supply state definitions to create and implement custom states 204. The state definitions 204 specify properties for the custom states 204 including at least a description of the state, an icon to represent the state, and criteria used to establish when the state applies to content items.

Then, state indicators indicative of both the primary states and the custom states for cloud content files are output in association with file system representations of the cloud content files exposed via the operating system (block 908). For instance, state indicators 212 may be presented in conjunction with various UIs and applications as previously noted. In particular, state indicators 212 indicative of both the primary states 206 and the custom states 208 may be output in connection with multiple different views of file system representations available via the operating system. The views may include at least icon views, list views, and detail views as discussed in relation to the examples of FIGS. 5 to 7. State indicators 212 may also be employed in connection with other file system representations across the user experience including, but not limited to, lists of recent items; file navigation functionality associated with productivity applications and other applications 112; items pinned to taskbars, start bars, and other user interface constructs; favorite lists; and desktop icons to name a few examples.

Having considered some example procedures, consider now a discussion of an example system and components of the system that can be employed to implement embodiments of the techniques for recognizing cloud content described herein.

Example System and Device

Figure 10:
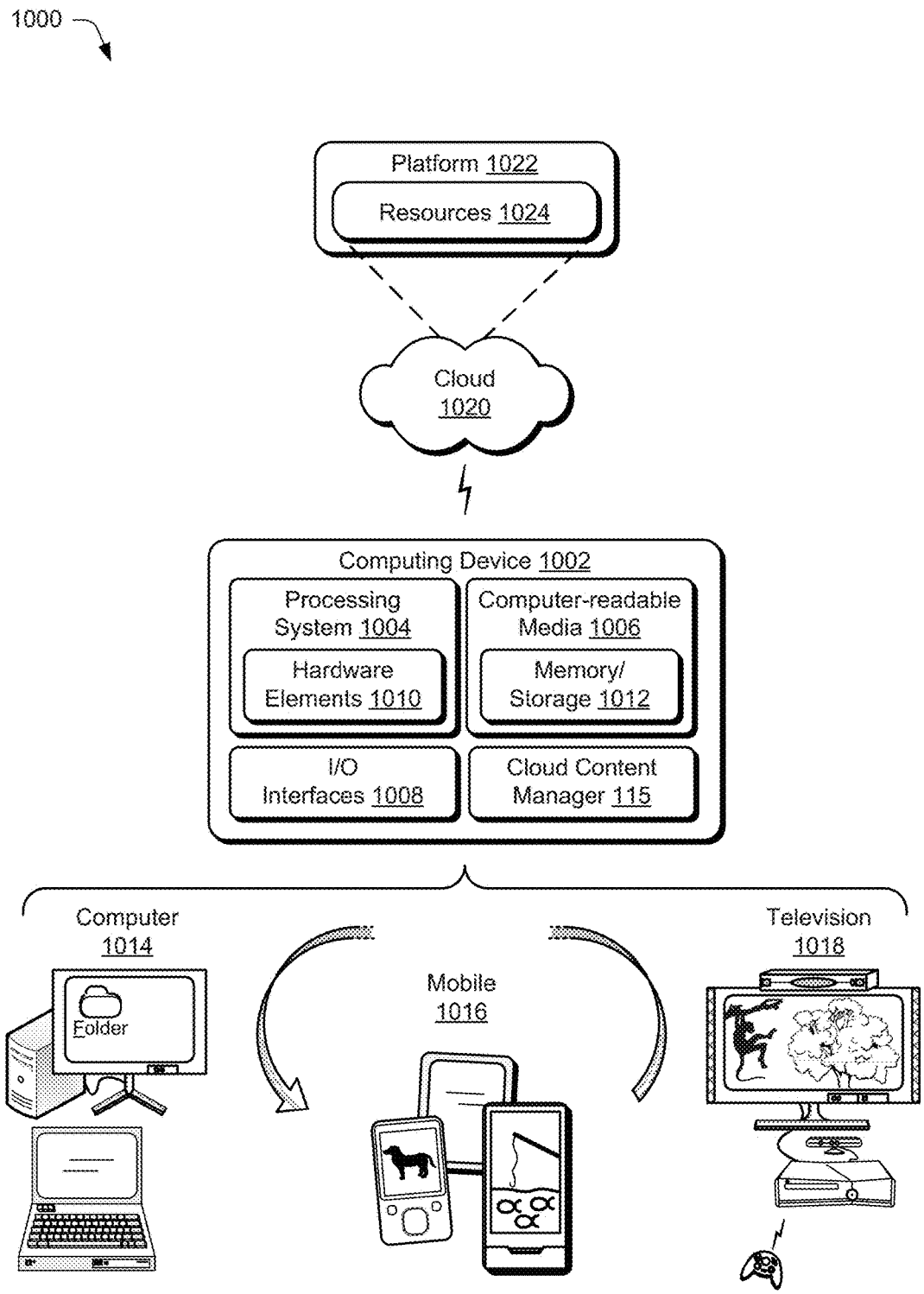
FIG. 10 illustrates an example system including various devices and components that can be employed to implement aspects of the cloud content states techniques described herein.

FIG. 10 illustrates an example system generally at 1000 that includes an example computing device 1002 that is representative of one or more computing systems and/or devices that may implement the various techniques described herein. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, file system 114, cloud content manager 115, and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the cloud content manager 115 on the computing device 1002. The functionality of the cloud content manager and other modules may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Example Implementations

Example implementations of techniques described herein include, but are not limited to, one or any combinations of one or more of the following examples:

Example 1

A method implemented by a computing device comprising: implementing a framework for the computing device operable to manage states for cloud content files accessible via the computing device from multiple cloud storage services and output state indicators with file system representations of the cloud content files, the states including a set of primary states indicative of synchronization status provided by the framework for use across the multiple cloud storage services; recognizing states associated with cloud content files in connection with rendering a user interface configured to display file system representations of the cloud content files; and exposing state indicators that reflect the recognized states along with the file system representations of the cloud content files in the user interface.

Example 2

A method as described in any one or more of the examples in this section, wherein the framework is a component of an operating system of the computing device.

Example 3

A method as described in any one or more of the examples in this section, wherein the set of primary states is controlled by the operating system.

Example 4

A method as described in any one or more of the examples in this section, wherein the cloud content files comprise content synchronized over a network with the multiple cloud storage services to facilitate access online access to the cloud content files across multiple devices.

Example 5

A method as described in any one or more of the examples in this section, wherein the state indicators for the set of primary states comprise icons each representing a different synchronization status.

Example 6

A method as described in any one or more of the examples in this section, wherein the set of primary states include at least an available offline state, a pending state, and an error state and the icons include a different icon used to visually represent each state.

Example 7

A method as described in any one or more of the examples in this section, wherein exposing the one or more state indicators comprises rendering the state indicators in association with items used to represent the cloud content files in the user interface.

Example 8

A method as described in any one or more of the examples in this section, further comprising associating metadata with the cloud content files to reflect the recognized states.

Example 9

A method as described in claim 8, wherein exposing the one or more state indicators further comprises: parsing the metadata to ascertain states associated with the cloud content files; mapping the states to corresponding state indicators; rendering items to represent the cloud content files in the user interface along with corresponding state indicators.

Example 10

A method as described in any one or more of the examples in this section, wherein the framework is configured to expose the state indicators across multiple different views of the file system representations available through one or more applications of the computing device.

Example 11

A method as described in any one or more of the examples in this section, further comprising exposing an interface to enable registration of the multiple cloud storage services with the framework and definition of custom states by the multiple cloud storage services.

Example 12

A method as described in any one or more of the examples in this section, further comprising obtaining via the interface state definitions defining one or more custom states for use with one or more of the multiple cloud storage services, wherein both primary states and custom states are included in recognizing states associated with the cloud content files and exposing state indicators that reflect the recognized states.

Example 13

One or more computer-readable storage media comprising instructions that, when executed by a client device, implement a cloud content manager module configured to perform operations comprising: establishing a set of primary states indicative of synchronization status of cloud content files accessible via a computing device from multiple cloud storage services, the set of primary states defined by an operating system of the computing device for use across the multiple cloud storage services; exposing an interface via the operating system to enable registration of the multiple cloud storage services with the operating system including definition of custom states; obtaining via the interface state definitions defining one or more custom states for use with one or more of the multiple cloud storage services; and outputting state indicators indicative of both the primary states and the custom states for cloud content files in association with file system representations of the cloud content files exposed via the operating system.

Example 14

One or more computer-readable storage media of any one or more of the examples in this section, wherein the interface comprises an application programming interface (API) designed to enable the multiple cloud storage services to plug-in to a framework supplied by the operating system for management of cloud content on behalf of the multiple cloud storage services.

Example 15

One or more computer-readable storage media of any one or more of the examples in this section, wherein the state definitions specify properties for the custom states including a description of the state, an icon to represent the state, and criteria used to establish when the state applies to content items.

Example 16

One or more computer-readable storage media of any one or more of the examples in this section, wherein the file system representations of the cloud content files for which state indicators indicative of both the primary states and the custom states are output include multiple different view of the file system representations available via the operating system including at least icon views, list views, and detail views.

Example 17

A computing device comprising: a processing system; and one or more modules configured to implement a framework to perform operations for management of cloud content files at the computing device on behalf of cloud storage providers, the operations including: providing a set of primary states indicative of synchronization status of cloud content files for use across multiple cloud storage services associated with the cloud storage providers; obtaining one or more state definitions from at least one of the cloud storage providers defining one or more custom states for use with cloud content files associated with the at least one of the cloud storage providers; recognizing states associated with cloud content files in connection with rendering a user interface configured to display file system representations of the cloud content files; and exposing state indicators that reflect the recognized states along with the file system representations of the cloud content files in the user interface, the state indicators including indicators associated with both the primary states and the one or more custom states.

Example 18

The computing device of any one or more of the examples in this section, wherein the user interface configured to display file system representations provides access to a list view of the cloud content files and the state indicators are configured as one or more icons associated with list entries for the cloud content files.

Example 19

The computing device of any one or more of the examples in this section, wherein the user interface configured to display file system representations provides access to a file icon view of the cloud content files and the state indicators are configured as one or more icons arranged proximate to file icons for the cloud content files to represent corresponding states.

Example 20

The computing device of any one or more of the examples in this section, wherein the state indicators are shown with individual files and folders containing one or more individual files, the state indicators for folders reflecting an overall state derived for the one or more individual files contained therein.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
implementing a framework for the computing device that is configured to: manage states for cloud content files from multiple cloud storage providers, and output state indicator icons with file system representations of a cloud content file, wherein the states comprise: a primary state, provided by the framework, that is indicative of a synchronization status of the cloud content file and a custom state, defined for a cloud storage provider of the cloud content file, that is associated with the content of the cloud storage provider, wherein an implementation of the framework executes operations that comprise:
identifying available slots for display of the state indicator icons in a user interface,
selecting one or more state indicator icons for the primary state based on the synchronization status of the cloud content file, wherein the selecting selects one or more slots of the available slots for display of the one or more state indicator icons,
in response to the selecting of the one or more slots for display of state indicator icons for the primary state, selecting one or more state indicator icons for the custom state of the cloud content file based on the available slots,
rendering the user interface configured to display file system representations of the cloud content file, and
exposing, via the user interface, the one or more state indicator icons associated with the primary state, the one or more state indicator icons associated with the custom state and the file system representations of the cloud content file.

2. The method as described in claim 1, wherein the framework is a component of an operating system of the computing device.

3. The method as described in claim 2, wherein the primary state is controlled by the operating system.

4. The method as described in claim 1, wherein the state indicator icons for the primary state comprise icons indicating: an available offline state of the cloud content file, a download state of the cloud content file, and an error state of the cloud content file.

5. The method as described in claim 1, further comprising: associating metadata with the cloud content file to reflect the primary state and the custom state.

6. The method as described in claim 5, wherein the exposing of the state indicator icons further comprises:
parsing the metadata to ascertain the primary state and the custom state associated with the cloud content file;
mapping the primary state and the custom state to corresponding state indicator icons for the primary state and the custom state; and
rendering items to represent the cloud content file in the user interface along with the corresponding state indicator icons.

7. The method as described in claim 1, wherein the framework is configured to expose the one or more state indicator icons for the primary state and the one or more state indicator icons for the custom state across multiple different views of the file system representations available through one or more applications of the computing device.

8. The method as described in claim 1, further comprising: exposing an interface to enable registration of the multiple cloud storage providers with the framework and definition of custom states by the multiple cloud storage providers.

9. The method as described in claim 8, further comprising: obtaining, via the user interface, state definitions defining one or more custom states for use with one or more of the multiple cloud storage providers, wherein the state indicator icons generate one or more icons associated with the custom state based on the state definitions.

10. The method as described in claim 1, wherein the framework is configured to prioritize, from the available slots identified, a selection of the one or more state indicator icons for the primary state of the cloud content file over a selection of the one or more state indicator icons for the custom state of the cloud content file.

11. The method as described in claim 1, wherein a number of state indicator icons associated with the custom state is selected for display based on a remaining amount of the available slots identified after the one or more slots of the available slots are selected for display of the state indicator icons for the primary state.

12. The method as described in claim 1, wherein the implementation of the framework further executes operations that comprise: detecting an update to the synchronization status of the cloud content file, updating, based on the detected update to the synchronization status, a selection of the one or more state indicator icons for the primary state of the cloud content file, and updating a selection of the one or more state indicator icons for the custom state of the cloud content file based on the updated selection of the state indicator icons for the primary state.

13. A system comprising:
at least one processor; and
a memory, operatively connected with the at least one processor, storing computer-executable instructions that, when executed by the at least one processor, causes the at least one processor to execute a method that comprises:
implementing a framework on the system that is configured to: manage states for cloud content files from multiple cloud storage providers, and output state indicator icons with file system representations of a cloud content file, wherein the states comprise: a primary state, provided by the framework, that is indicative of a synchronization status for the cloud content file and a custom state, defined for a cloud storage provider of the cloud content file, that is associated with the content of the cloud storage provider, wherein an implementation of the framework executes operations that comprise:
identifying available slots for display of the state indicator icons in a user interface, selecting one or more state indicator icons for the primary state based on the synchronization status of the cloud content file, wherein the selecting selects one or more slots of the available slots for display of the one or more state indicator icons, in response to the selecting of the one or more slots for display of state indicator icons for the primary state, selecting one or more state indicator icons for the custom state of the cloud content file based on the available slots, rendering the user interface configured to display file system representations of the cloud content file, and exposing, via the user interface, the one or more state indicator icons associated with the primary state, the one or more state indicator icons associated with the custom state and the file system representations of the cloud content file.

14. The system as described in claim 13, wherein the framework is configured to prioritize, from the available slots identified, a selection of the one or more state indicator icons for the primary state of the cloud content file over a selection of the one or more state indicator icons for the custom state of the cloud content file.

15. The system as described in claim 13, wherein the state indicator icons for the primary state of the cloud content file comprise icons indicating: an available offline state of the cloud content file, a download state of the cloud content file, and an error state of the cloud content file.

16. The system as described in claim 13, wherein the executed method further comprises: exposing an interface to enable registration of the multiple cloud storage providers with the framework and definition of custom states by the multiple cloud storage providers.

17. A computer-readable storage media that comprises instructions which, when executed by a client device, implements a cloud content manager module configured to perform operations comprising:

implementing a framework on the client device that is configured to: manage states for cloud content files from multiple cloud storage providers, and output state indicator icons with file system representations of a cloud content file, wherein the states comprise: a primary state, provided by the framework, that is indicative of a synchronization status for the cloud content file and a custom state, defined for a cloud storage provider, that is associated with the content of the cloud storage provider, wherein an implementation of the framework executes operations that comprise:

identifying available slots for display of the state indicator icons in a user interface, selecting one or more state indicator icons for the primary state of a cloud content file based on the synchronization status of the cloud content file, wherein the selecting selects one or more slots of the available slots for display of the one or more state indicator icons, in response to the selecting of the one or more slots for display of state indicator icons selected for the primary state, selecting, from available icons associated with the cloud storage provider, one or more state indicator icons for the custom state of the cloud content file, rendering the user interface configured to display file system representations of the cloud content file, and exposing, via the user interface, the one or more state indicator icons associated with the primary state, the one or more state indicator icons associated with the custom state and the file system representations of the cloud content file.

18. The computer-readable storage media as described in claim 17, wherein the framework is configured to prioritize, from the available slots identified, a selection of the one or more state indicator icons for the primary state of the cloud content file over a selection of the one or more state indicator icons for the custom state of the cloud content file.

19. The computer-readable storage media as described in claim 17, wherein the state indicator icons for the primary state of the cloud content file comprise icons indicating: an available offline state of the cloud content file, a download state of the cloud content file, and an error state of the cloud content file.

20. The computer-readable storage media as described in claim 17, wherein the operations further comprise: exposing an interface to enable registration of the multiple cloud storage providers with the framework and definition of custom states by the multiple cloud storage providers.

\* \* \* \* \*